US012728664B2

(12) United States Patent
Galanis

(10) Patent No.: US 12,728,664 B2
(45) Date of Patent: Sep. 8, 2026

(54) MARKING INSTRUMENT

(71) Applicant: BIC Violex Single Member S.A., Anoixi (GR)

(72) Inventor: Christos Galanis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 4 days.

(21) Appl. No.: 18/864,127

(22) PCT Filed: May 11, 2023

(86) PCT No.: PCT/EP2023/062561
§ 371 (c)(1),
(2) Date: Nov. 8, 2024

(87) PCT Pub. No.: WO2023/232423
PCT Pub. Date: Dec. 7, 2023

(65) Prior Publication Data

US 2025/0303779 A1 Oct. 2, 2025

(30) Foreign Application Priority Data

May 31, 2022 (EP) .................................... 22176542

(51) Int. Cl.

| | |
|---|---|
| ***B43K 17/00*** | (2006.01) |
| ***A46B 9/10*** | (2006.01) |
| ***B43K 8/02*** | (2006.01) |

(52) U.S. Cl.
CPC ................ *B43K 17/00* (2013.01); *A46B 9/10* (2013.01); *B43K 8/02* (2013.01); *A46B 2200/205* (2013.01)

(58) Field of Classification Search
CPC ..... A46B 5/0025; A46B 5/0029; A46B 9/005; A46B 2200/205; B43K 8/003; B43K 8/02; B43K 17/00; B43K 17/005; B43K 29/08
(Continued)

(56) References Cited

U.S. PATENT DOCUMENTS 1,701,771 A * 2/1929 Stefano .................. F25C 5/043 401/109
5,048,989 A * 9/1991 Stageman .............. B43K 21/18 401/109
(Continued)

FOREIGN PATENT DOCUMENTS

CN 2334598 Y 8/1999
CN 113815334 A 12/2021
(Continued)

OTHER PUBLICATIONS

Bae; Machine translation of KR-20110125686-A (Year: 2011).*
(Continued)

*Primary Examiner* — David P Angwin
*Assistant Examiner* — Bradley S Oliver
(74) *Attorney, Agent, or Firm* — Bookoff McAndrews, PLLC

(57) ABSTRACT

A tip reinforcing system that is configured to allow a user to adjust a rigidity attribute of the marking tip of a instrument, the tip reinforcing system including: a tip core cavity that is a hollow portion within a marking tip that extends axially through the marking tip, a tip reinforcing core configured to be movable within the tip core cavity in order to change the internal structure of the marking tip, and a core moving mechanism configured to be operated by a user to move the tip reinforcing core relative to the housing body of the
(Continued)

(a) (b)

instrument in order to adjust the level of exposure of the tip reinforcing core within the marking tip.

20 Claims, 5 Drawing Sheets

(58) Field of Classification Search
USPC ................................ 15/244.1; 401/109, 116
See application file for complete search history.

(56) References Cited

U.S. PATENT DOCUMENTS

| | | | | | |
|---|---|---|---|---|---|
| 5,067,837 | A * | 11/1991 | Panopoulos | B43K 17/005 401/107 |
| 5,137,038 | A * | 8/1992 | Kingsford | A45D 40/265 132/218 |
| 6,155,733 | A | 12/2000 | Holbrook et al. | |
| 6,173,471 | B1 * | 1/2001 | Yau | A46B 3/12 15/205 |
| 6,887,504 | B2 | 5/2005 | Palmer et al. | |
| 7,527,588 | B2 | 5/2009 | Zaddem et al. | |
| 10,765,832 | B2 | 9/2020 | Brustad et al. | |
| 2009/0240236 | A1 | 9/2009 | Fogarty | |
| 2014/0360616 | A1 | 12/2014 | Kramer, Jr. | |
| 2018/0107293 | A1 * | 4/2018 | Yeh | B43K 29/08 |

FOREIGN PATENT DOCUMENTS

| | | | | |
|---|---|---|---|---|
| EP | 1656261 | B1 | 5/2006 | |
| EP | 2860045 | B1 | 4/2015 | |
| GB | 2243995 | A | 11/1991 | |
| JP | H07313515 | A | 12/1995 | |
| KR | 20110125686 | A * | 11/2011 | B43K 29/00 |
| WO | 9211785 | A1 | 7/1992 | |

OTHER PUBLICATIONS

© 1995-2024 eBay Inc. Jaylynn's Bargains. (Oct. 12, 2024). Bic Bodymark Temporary tattoo marker henna vibes 3 markers/3 stencils new. eBay. https://www.ebay.com/itm/196616968164?.

© 1996-2024, Amazon.com, Inc. Skin companion twin tip tattoo pen—6+1 free—multi color pack by Skin Companion. Amazon.in: Beauty. https://www.amazon.in/Skin-Companion-Twin-Tip-Tattoo/dp/B01JBFQ9PO.

© 1996-2024, Amazon.com, Inc. Toysmith ink-A-do Tattoo Pens, for boys & girls ages 6+. Amazon.in: Toys and Games. https://www.amazon.com/Toysmith-1245-Ink-a-Do-Tattoo-Pens/dp/B009KU344A.

© 1996-2024, Amazon.com, Inc. Zebra permanent marker mckee extra fine B-mo-120-mc-bk Black 10 pieces. Amazon.in: Office Products. https://www.amazon.com/Zebra-permanent-marker-B-MO-120-MC-BK-pieces/dp/B003M6AICY.

© 1996-2024, Amazon.com, Inc. Zxuezheng. 3Pcs surgical tip markers skin marker pen tattoo pen(0.5mm,1mm) with paper ruler (2 Single Head +1 double head). Amazon.in: Industrial & Scientific. https://www.amazon.com/FBAPluto-Surgical-Markers-Marker-Tattoo/dp/B06X9WQTC3.

© 2024 Nordson Corporation. Medical reinforced tubing. Nordson Medical. https://www.nordsonmedical.com/Components-and-Technologies/Medical-Tubing/Reinforced-Tubing/.

© 2024 Ubuy Co. Professional sterile surgical skin marker pen—Japan: Ubuy. Ubuy Japan. https://www.u-buy.jp/en/product/1AF9EZMRK-surgical-skin-marker-pen-4-pack-professional-sterile-tip-tattoo-stencil-markers-pen-scribes-purple-individually-wrapped-tip-size-0-5mm-1mm-3-5mm.

Search Report and Written Opinion issued in International Application No. PCT/EP2023/062561, mailed Aug. 24, 2023.

* cited by examiner

MARKING INSTRUMENT

CROSS-REFERENCE TO RELATED APPLICATIONS

This is a National Stage application under 35 U.S.C. § 371 of International application no. PCT/EP2023/062561, filed May 11, 2023, now published as WO 2023/232423 A1, which claims priority to European patent application no. 22176542.3, filed on May 31, 2022, the entireties of which are incorporated herein by reference.

TECHNICAL FIELD

The present disclosure relates to the field of marking instruments. More specifically, the present disclosure relates to marking instruments with a writing tip that has adjustable rigidity.

BACKGROUND

Painting and coloring tools are commercialized with different tip geometries and hardness properties to address the need of different approaches to ink transferring on the writing surface. For instance, paint brushes and related painting tools, such as brush pens, may have softer tips that allow for a greater degree of line variation and linewidths, but may require more skill and control to use. Meanwhile, firm tips can produce good line variation, but may require more pressure. Bristle tips tend to fall on the softer side, while synthetic and felt tips tend to be firmer. The ability of the tip of a writing instrument to retain its original shape after a stroke determines its elasticity. If the tip has good elasticity, it will bounce right back to its original shape after each stroke.

It is however not convenient to have available many writing tools for different coloring, painting, artistic writing approaches. Beginners in artistic writing may need to learn first with a harder tip that is more controllable and gradually try softer tips. Intermediate users can consider softer or fine tips. They can create more line variation, which allow for more dramatic brushstrokes. Thus, users need to purchase different tools in order to effectively learn, which is not always easy, or there are no available products to purchase or there is an increased cost for this.

The present disclosure aims to address one or more problems in the prior art.

SUMMARY

An aspect of the present disclosure is directed toward a tip reinforcing system that is configured to allow a user to adjust a rigidity attribute of the marking tip of a marking instrument, the tip reinforcing system comprising a tip core cavity that extends axially through the marking tip, a tip reinforcing core configured to be movable within the tip core cavity, and a core moving mechanism configured to be operated by a user to move the tip reinforcing core relative to the housing body of the marking instrument in order to adjust the level of exposure of the tip reinforcing core within the marking tip.

The disclosure discloses marking instrument (for example a writing and drawing instrument) with a marking tip that has adjustable hardness. It allows the user to apply ink with both precision and easy coverage of large areas. The core, when inserted into the outer tip volume, increases the rigidity of the marking tip, providing greater drawing precision. When the core is retracted, the tip becomes soft again to facilitate greater ink coverage of larger areas or to enable drawing of linewidths of greater variability.

The user can adjust the core position via a core moving mechanism to draw/write with the tip of:

Maximum hardness for maximum drawing precision. The core position is adjusted at the closest position to the ultimate edge/point of the tip.

Minimum hardness for maximum ink coverage capability. The core position is adjusted at the furthest position from the ultimate edge/point of the tip.

Custom intermediate hardness for custom precision and ink coverage capability. The core position may be adjusted at an intermediate position between the closest and furthest position in relation to the ultimate edge/point of the tip.

In examples, the core moving mechanism may comprise an actuator that is configured to move between an on position and an off position, wherein the on position moves the tip reinforcing core to the maximally forward position and the off position move the tip reinforcing core to the maximally rearward position. The actuator may for example comprise a button or a slider.

In examples, the core moving mechanism may be a screw-type mechanism that is configured to move the position of the tip reinforcing core in an incremental fashion.

In examples, the core moving mechanism may be configured to have predefined stepped levels of exposure of the tip reinforcing core such that the user can adjust the position of the tip reinforcing core between the levels.

In examples, the core moving mechanism may be positioned within a rearward end of the marking instrument.

In examples, the core moving mechanism may be configured to slide on a side of the marking instrument in coordination with a movement of the tip reinforcing core.

In examples, the core moving mechanism may further comprise a spring and locking mechanism.

In examples, the core may be configured to be removed and replaceable.

In examples, the tip reinforcing system may comprise a plurality of tip reinforcing cores, wherein each tip reinforcing core has different characteristics from the other tip reinforcing cores.

In examples, the tip reinforcing system may further comprise a core guiding tube configured to extend through the marking instrument through the cavity so as to provide a hollow internal path that extends axially through the marking instrument for the tip reinforcing core.

In examples, an exterior side surface of the tip reinforcing core may comprise threads that may interact with a threaded surface on the interior surface of the guiding tube.

An aspect of the disclosure is directed toward a marking instrument comprising a body housing having a longitudinal axis, a marking tip that includes bristle tips or a synthetic porous material, and a tip reinforcing system.

In examples, the marking tip may be made from a conductive material such that the marking instrument is adapted for use in drawing software applications in devices with capacitive touchscreens.

In examples, the marking instrument may be a paint brush that is configured to allow a user to use the marking tip to pick up an external pigment.

In examples, the marking instrument may further comprise a reservoir configured to contain a pigment, wherein the reservoir is connected to the marking tip.

This disclosure enables the user to have a single writing, drawing instrument with a vast range of coloring capabilities, whereas before the user would have to purchase multiple drawing instruments to achieve similar effects.

Specifically, it provides within a single device:

The ability to have a firm tip for better control and more precise or thinner linewidths.

The ability to have a soft tip that allows for a greater degree of line variation or coloring large areas.

The ability to have an intermediate or custom tip hardness to balance control, precision and line variation according to special user needs.

A great agility for facilitating learning of drawing, writing, and artistic writing with different levels of tip hardness.

A versatile, personalized and creative tool, that provides more fun for kids and adults.

More durability regarding the preservation of the tip's elasticity after extensive use due to the core's reinforcing effect.

DETAILED DESCRIPTION

Hereinafter, a detailed description will be given of the present disclosure. The terms or words used in the description and the aspects of the present disclosure are not to be construed limiting as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

Figure 1:
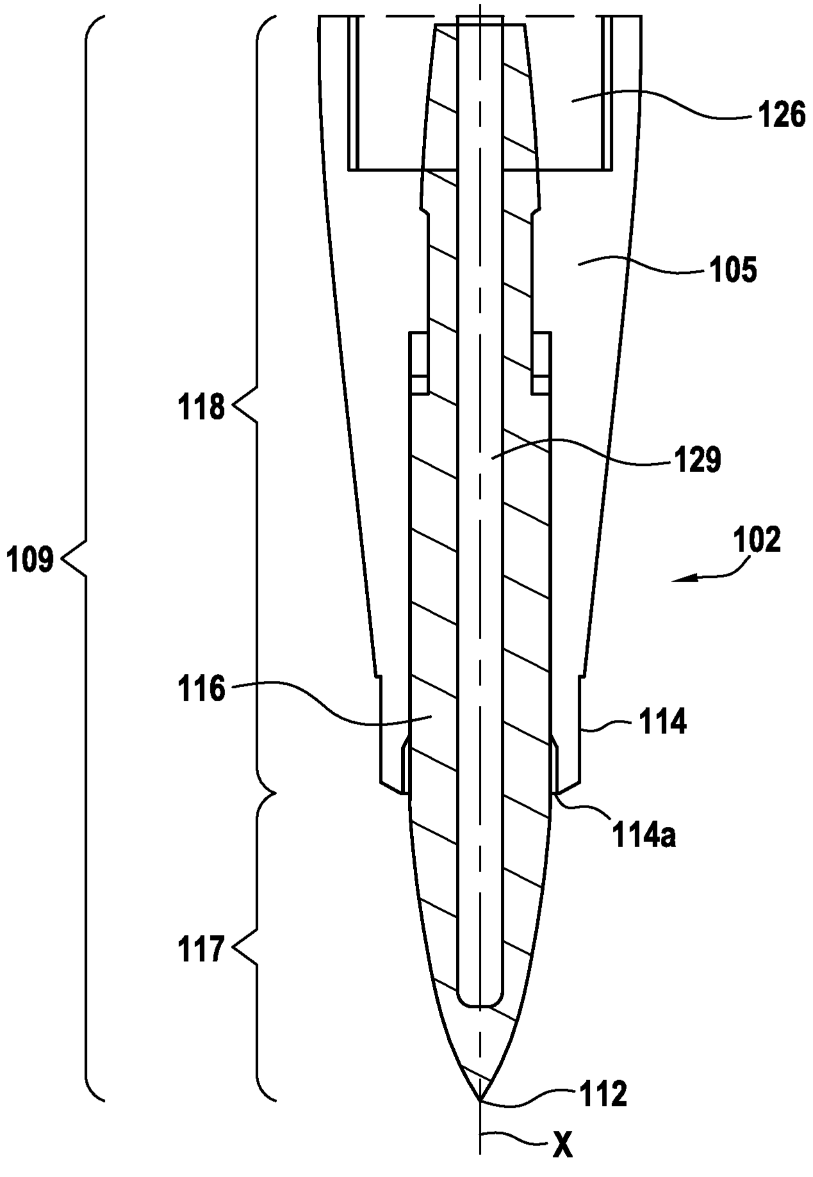
FIG. 1 shows a cutout view of an aspect of an exemplary marking instrument of the present disclosure.

In a first exemplary embodiment, the present disclosure relates to a marking instrument 102 as shown in FIG. 1 of which the description follows. FIG. 1 is a schematic partial view of a marking instrument 102. Certain features of the writing instrument are rendered invisible for ease of view in FIG. 1.

The marking instrument 102 may be any type of writing instrument that is configured to allow a user to write and draw with various line widths. More specifically, the marking instrument 102 may be a marker with a marking tip 116 that includes bristles tips, which is commonly known as a brush pen. The brush pen may have similar utility to a paint brush, wherein a user may coat the brush in pigment before usage, with the exception that with the brush pen the pigment does not need to be manually applied to the outside of the brush. Thus, the marking tip 116 may, for example, convey ink to a writing surface when the writing instrument is ink-based. As such, the marking instrument 102 may provide functionality similar to both a brush and a marker. In an embodiment, the marking tip can be made from a synthetic porous material.

The marking instrument 102 may include a body housing 105 having a longitudinal axis X. The body housing 105 may be a unitary body, or may comprise multiple components.

The marking instrument 102 may include at a forward end 109 of the instrument a tip component 114 comprising an orifice 114*a* which is located at the distal end of the tip component 114. The orifice 114*a* may separate an external portion 117 and an internal portion 118 of the marking tip 116.

The external portion 117 may extend out of the body housing 105 through the writing orifice 114*a* and end in an edge 112. The external portion 117 of the marking tip 116 is exposed so as to be configured to deliver pigment to a writing surface. The edge 112 of the external portion 117 may have a shape that is any of a variety of shapes in accord with the preference of a user for brushes and/or brush pens. For instance, common edge 112 shapes include, without limit, a conical shape and a bullet shape. Additionally, the external portion 117 may be sized in accord with a user's preference for similar reasons, and may be any typical marking tip size.

The internal portion 118 may be located substantially or entirely within the body housing 105 of the marking instrument 102. The internal portion 118 of the marking tip 116 may be connected to a supply of pigment from an internal reservoir 126. The internal portion 118 may be configured so as to allow the pigment to pass from the reservoir 126 to the writing surface via the external portion 117.

The marking tip 116 may be produced of any of a variety of materials. For example, natural hair bristles may be used. Traditionally, the hair of a sable or a weasel is used to produce marking tips 116. In examples, the marking tip 116 may be made of synthetic materials, such as nylon. In examples, the marking tip 116 may be a felt tip, such that the felt tip may be made of highly compressed synthetic fibers or porous ceramics. In examples, the marking tip 116 may be produced from a synthetic brush hair. The synthetic brush hair may be augmented with properties that make synthetic brush hairs desirable for specific applications. Synthetic brush hairs may be, for instance, infused with conductive properties to produce real-life paint effects in software applications related to digital painting in devices with capacitive touchscreens. In this scenario, it may be desirable to produce the marking tip 116 from soft conductive material, such as with physical characteristics including soft non-metallic elastic conductors, the materials including soft conductive rubber, soft conductive plastic, etc. Other materials may be conceived.

The reservoir 126 may be located within the body housing 105 of the marking instrument 102 and be configured to contain a pigment. The reservoir 126 may connect with the inner portion 118 of the marking tip 116.

Figure 2:
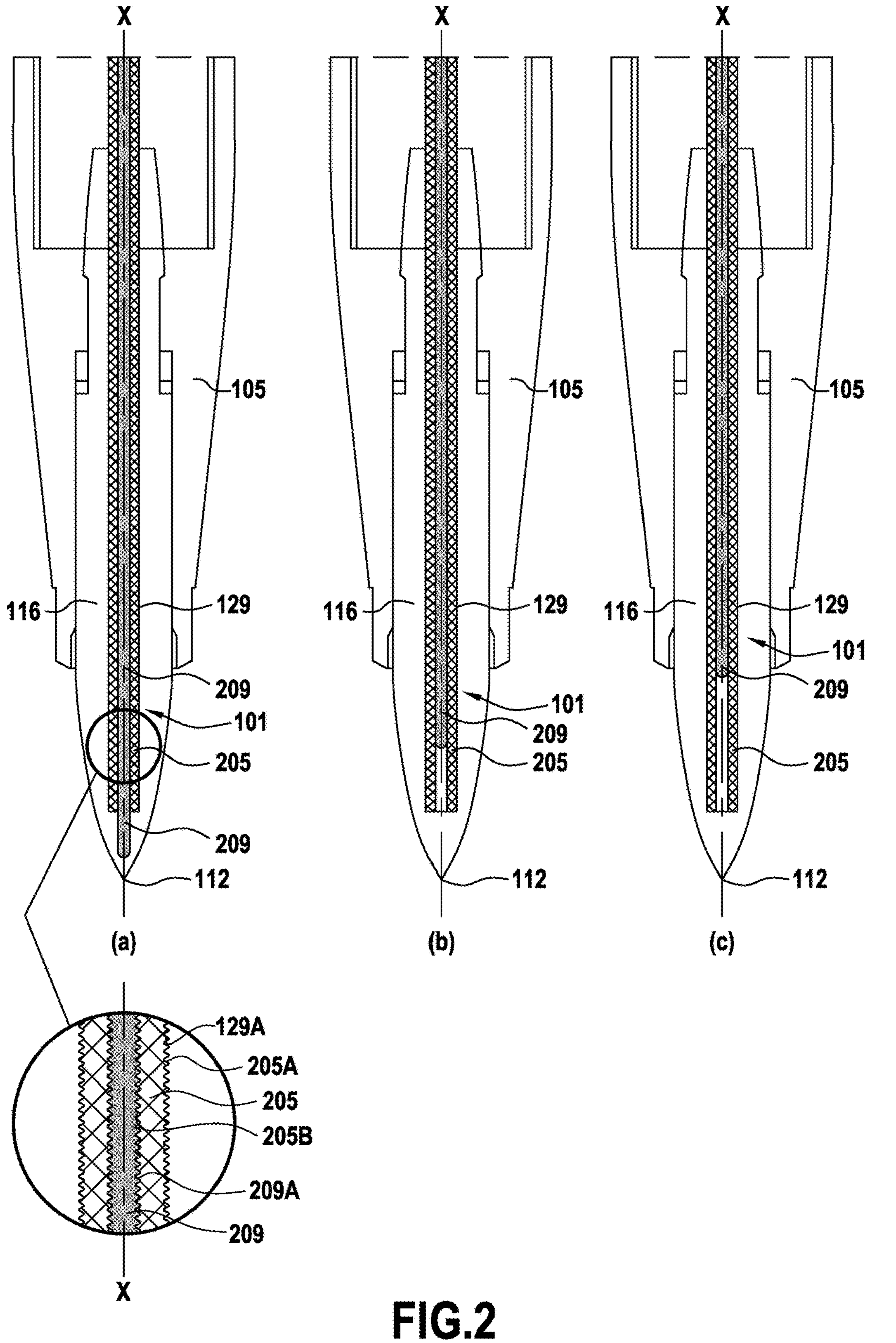
FIGS. 2A-C shows a cutout view of multiple configurations of an exemplary tip reinforcing core of the present disclosure.

FIGS. 2A-C demonstrate an aspect of the disclosure that is directed toward a tip reinforcing system 101 that is configured to allow a user to adjust a rigidity attribute of the marking tip 116 of the marking instrument 102.

In an aspect of the disclosure, the tip reinforcing system includes a tip core cavity 129, as illustrated in FIG. 1, which is a hollow portion within the marking tip 116 that extends axially through the marking tip 116. For example, the tip core cavity 129 may be an extruded type of blind opening. The cavity may be open from the connecting to the reservoir 126 within the internal portion 118 of the marking tip 116. In examples, the cavity 129 may be blind closed, such as within the external portion 117 close to the edge 112 of the marking tip 116. The end surface at the closed end may be any one of a variety of shapes, including, but not limited to, flat, conical, hemispherical, counterbore, etc.

Similarly, the cavity 129 may extend through the reservoir 126, such that it may be an extruded type of through opening. The cavity 129 may open from the end of the reservoir 126 that connects to the inner portion 118, and the cavity 129 may extend to the other end of the reservoir 126.

In examples, the tip core cavity 129 may have a substantially constant cross-sectional shape, such as orthogonal to axis X of the writing instrument. For instance, the cross-sectional shape may be circular, but other shapes are conceived, such as oval, square, polygonal, etc. The walls of the cavity 129 may be substantially smooth meaning that is would not include any recesses or projections. In an example, the interior surface of the cavity 129 may be threaded, as shown in the enlarged portion of FIG. 2A, showing threads 129A. Other configurations are conceived.

Returning to FIG. 2A, an aspect of the disclosure is directed toward a core guiding tube 205, which is a tube that may be located axially within the body housing 105 of the marking instrument 102. The core guiding tube 205 may be located within the tip core cavity 129 and extend to the reservoir 126. The core guiding tube 205 may extend into the reservoir 126. Thus, the core guiding tube 205 may extend through the marking instrument 102 so as to provide a hollow internal path that extends axially through the marking instrument 102 for the tip reinforcing core 209. The core guiding tube 205 may be substantially fixed relative to the body housing 105 of the marking instrument 102. Thus, while the core guiding tube 205 provides additional stability to the tip reinforcing system by providing a more rigid internal structure for the brush tip and easy travelling path, the core guiding tube 205 may not be necessary if these benefits are not desired.

The core guiding tube 205 may be formed from a polymeric material, although other materials are considered, such as metallic, ceramic, textile, composite materials. Further, the material of the tube 205 may be elastic and soft, such as similar to the softness of the marking tip 116. It is conceived that the core guiding tube 205 may be of unitary construction, or may be a composite of materials. For example, the core guiding tube 205 may be made of a flexible material close to the edge 112 of the marking tip 116 and a more rigid material inside the marking instrument 102. Further, it is conceived that the surface of the core guiding tube 205 may be substantially solid, may be with or without openings, and/or may be porous or not porous. The outer surface of the core guiding tube 205 may comprise threads 205A configured to interact with the threads 129A, if provided.

The tube 205 thickness may be as small as possible. For example, the tube 205 thickness may range from 0.1 mm to 5.0 mm. In examples, the tube 205 thickness may range from 0.1 to 0.3 mm. In examples, the tube 205 thickness may range from 0.2 to 0.3 mm. In examples, the tube 205 thickness may range from 0.3 to 0.5 mm. In examples, the tube 205 thickness may range from 0.5 to 0.7 mm. In examples, the tube 205 thickness may range from 0.7 to 1.0 mm. In an example, the tube 205 thickness may range from 1.0 to 5.0 mm.

Figure 3:
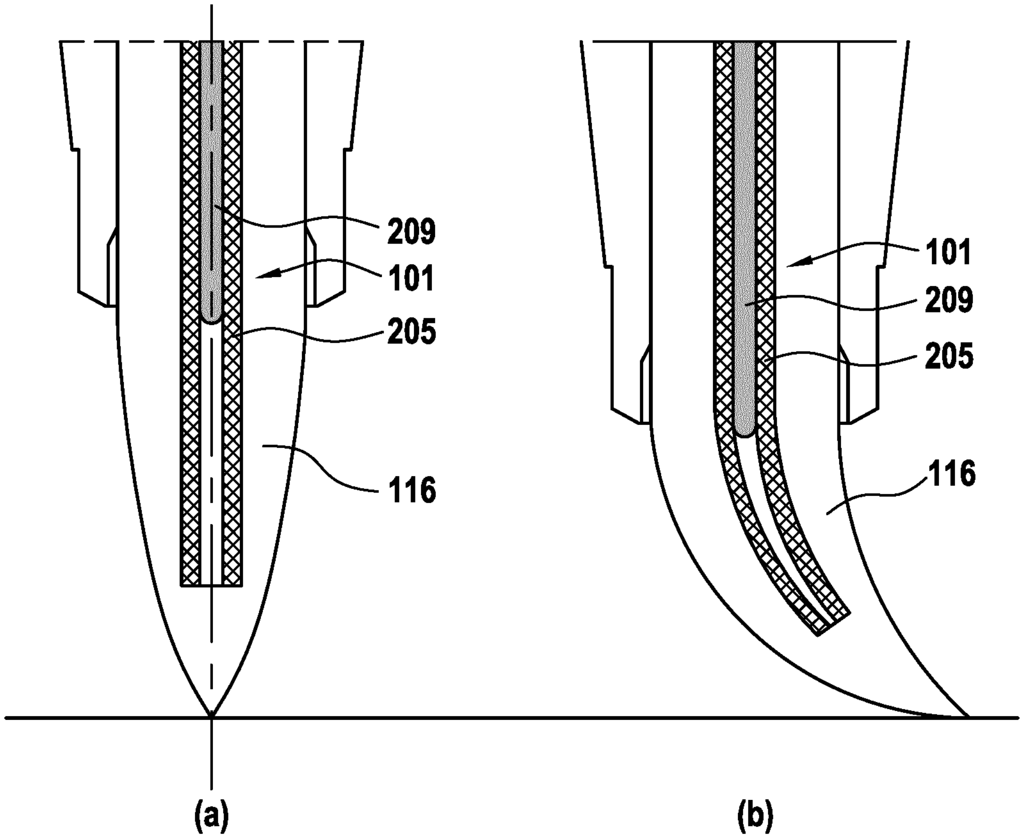
FIGS. 3A-B shows a cutout view of an exemplary marking tip during use.

FIGS. 3A-B demonstrates characteristics of the tube 205 during usage of the marking instrument 102. As can be seen in FIG. 3A, the tube 205 may stay in a neutral position relative to the marking tip 116 when the marking instrument 102 is not being used to convey pigment onto a surface by dragging the edge 112 on the surface. During writing, the tube 205 may deform, such as in a non-permanent elastic way, along with the outer portion 118.

Returning to FIG. 2A, an aspect of the disclosure is directed toward a tip reinforcing core 209 that is configured to be movable within the tip core cavity 129 in order to change the internal structure of the marking tip 116, affecting the rigidity of the marking tip 116 which is a member with an elongated shape that extends in an axial direction. The tip reinforcing core 209 may be located within the housing body 105 of the marking instrument 102, and more specifically, along axis X of the marking instrument such that the tip reinforcing core 209 may be located within the core guiding tube 205. The tip reinforcing core 209 may extend through the areas of the marking instrument 102 that the core guiding tube 205 are disposed within, namely the reservoir 126 and marking tip 116. In examples, the tip reinforcing core 209 may be substantially the same length as the core guiding tube 205. In examples, the tip reinforcing core 209 may be shorter than the core guiding tube 209. In examples, the tip reinforcing core 209 may be longer than the core guiding tube 205.

The tip reinforcing core 209 may be formed from any elastic material, including metallic (stainless steel, spring steel), polymeric, ceramic, or composite materials. For instance, the tip reinforcing core 209 may be formed from a material that has similar attributes to the marking tip 116 material, that is denser and more rigid than the marking tip 116 material, or that is less dense and less rigid than the marking tip 116 material.

The tip reinforcing core 209 may have an extruded type of a cross-sectional shape. For instance, the cross-section (orthogonal to axis X) shape of the tip reinforcing core 209 may be substantially circular. Other shapes are conceived. For example, the tip reinforcing core 209 may be square, rectangular, polygonal, oval, etc. The shape of the core 209 may be a rod-type, or may be pipe-type, such as with an internal hollow portion. In examples where the shape of the core 209 is pipe-like, the shape may be suitable for allowing any air or ink trapped and pressed during movement of the tip reinforcing core 209 to be able to be guided through an internal hole, thus relieving the pressure. For the same reason, the tip reinforcing core 209 may have openings on the external side and end surfaces (e.g., on the side cylindrical surface, as well as on the flat end surfaces), and/or may be porous.

In examples, the side surface of the core 209 may be smooth, meaning that is would not include any recesses or projections. In examples, the exterior side surface of the tip reinforcing core 209 may comprise threads 209A (see the enlarged portion of FIG. 2A) that may interact with a threaded surface 205B on the interior surface of the guiding tube 205, and/or a surface of the marking tip 116, reservoir 126, and/or other members of the marking instrument 102.

The tip reinforcing core 209 may have a width or diameter of between 0.1 mm and 15 mm. In examples, the tip reinforcing core 209 may have a width or diameter of between 0.1 to 0.5 mm. In examples, the tip reinforcing core 209 may have a width or diameter of between 0.3 to 0.5 mm. In examples, the tip reinforcing core 209 may have a width or diameter of between 0.5 to 1 mm. In examples, the tip reinforcing core 209 may have a width or diameter of between 0.1 to 1 mm. In examples, the tip reinforcing core 209 may have a width or diameter of between 1 to 2 mm. In examples, the tip reinforcing core 209 may have a width or diameter of between 1 to 3 mm. In examples, the tip reinforcing core 209 may have a width or diameter of between 2 to 5 mm. In examples, the tip reinforcing core 209 may have a width or diameter of between 5 to 15 mm.

The tip reinforcing core 209 end surface, which is to say the surface of the end in the axial direction that is closest to the edge 112, may have a shape that is similar to that of the edge 112. The tip reinforcing core end surface may have a smaller offset size as compared to the edge. This may enable the core 205 to more closely reach edge, thus providing more precision on the handling of the marking tip. It is also conceived that the tip reinforcing core end surface may have a shape that is conical with at least one of a group of: a sharp apex, a flat apex, a dome apex, a shape that is hemispherical or dome-like, or a flat shape.

The tip reinforcing core 209 may be configured to move in the axial direction within the marking instrument 102. In FIG. 2A, the tip reinforcing core 209 is shown to be in a maximally "forward" position toward the edge 112 of the marking tip 116, thus maximizing the rigidity of the marking tip 116. In FIG. 2B, the tip reinforcing core 209 is shown to be withdrawn from the forward position, thus reducing the rigidity of the marking tip 116. In FIG. 2C, the tip reinforcing core 209 is shown to be in a maximally "rearward" position, farthest from the edge 112 of the marking tip 116, and thus minimizing the rigidity of the marking tip 116. The position of the tip reinforcing core 209 within the tip core cavity 129 changes the rigidity of the brush tip: the more forwardly advanced the position of the tip reinforcing core, the higher the rigidity of the brush tip.

FIG. 4A-B demonstrates an aspect of the disclosure directed toward a core moving mechanism 412, which is configured to be operated by the user to move the tip reinforcing core 209 relative to the housing body 105 of the marking instrument 102 in order to adjust the level of exposure of the tip reinforcing core 209 within the marking tip 116.

In examples, the core moving mechanism 412 may operate similarly to a retractable pen, wherein a mechanism extends and retracts a pen tip in and out of a pen housing. Thus, the core moving mechanism 412 may be positioned within a rearward end 408 of the marking instrument 102 and may have a button 417 that engages with the tip reinforcing core 209. When the user activates the button 417, the tip reinforcing core 209 may move in a first direction, and when the user releases the button 417, the tip reinforcing core 209 may move in a second direction. Similarly, the tip reinforcing core 209 may utilize a spring and locking mechanism within the body housing 105 to keep the tip reinforcing core 209 engaged in a first position when the button 417 is activated a first time and keep the tip reinforcing core 209 engaged in a second position when the button 417 is activated a second time. In examples, an "on" position may fully expose the tip reinforcing core 209 within the external portion 117 of the marking tip 116, or in other words, move the tip reinforcing core 209 into the maximally forward position toward the edge 112 of the marking tip 116, thus maximizing the rigidity of the marking tip 116, as show in FIG. 4A. An "off" position may fully retract the tip reinforcing core 209 inside the body housing 105, or in other words move the tip reinforcing core 209 into the maximally rearward position away from the edge 112 of the marking tip 116, thus minimizing the rigidity of the marking tip 116, as shown in FIG. 4B. The button 417 may be configured to toggle between the "on" position and the "off" position. The button 417 may be removable from the body housing 105 of the marking instrument 102, thus allowing the user to access the guiding tube 205, that encloses the tip reinforcing core 209.

In examples, the core moving mechanism 412 may be a screw-type mechanism that is configured to move the position of the tip reinforcing core 209 in an incremental fashion. Thus, the core moving mechanism 412 may be adjusted in any position between the most exposed (most forward) and least exposed (most rearward) tip reinforcing core 209 position. The button 417 may be a "plunger" that is engaged with the body housing 105 of the writing instrument, such as through a threaded connection that allows for the incremental position change of the core moving mechanism 412. As recited previously, the button 417 may be removable also in this case, for example by unscrewing it in the opposite direction than the direction used to allow for the incremental position change of the core moving mechanism 412.

In examples, the core moving mechanism 412 may be configured to have predefined stepped levels of exposure of the tip reinforcing core 209 such that the user can adjust the position of the tip reinforcing core 209 between the levels. For instance, the core moving mechanism 412 may be configured to position the tip reinforcing core 209 at positions that may be represented as a percentage of the distance between the most forward and most rearward position of the tip reinforcing core. In a non-limiting example, the positions may be at values of 0%, 25%, 50%, 75%, and 100%, with 0% representing a most rearward position and 100% representing a most forward position. The core moving mechanism 412 may be configured to maintain the tip reinforcing core 209 at a substantially stationary position when the core moving mechanism 412 is not being adjusted by the user. Thus, a user may be able to easily adjust the position of the tip reinforcing core 209 to a known position that represents a known rigidity of the marking tip 116 with great accuracy and minimal adjustment.

In examples, the core moving mechanism 412 may be an electrical mechanism that is configured to adjust the position of the tip reinforcing core 209 using an actuator that responds to the input of a user.

Figure 5:
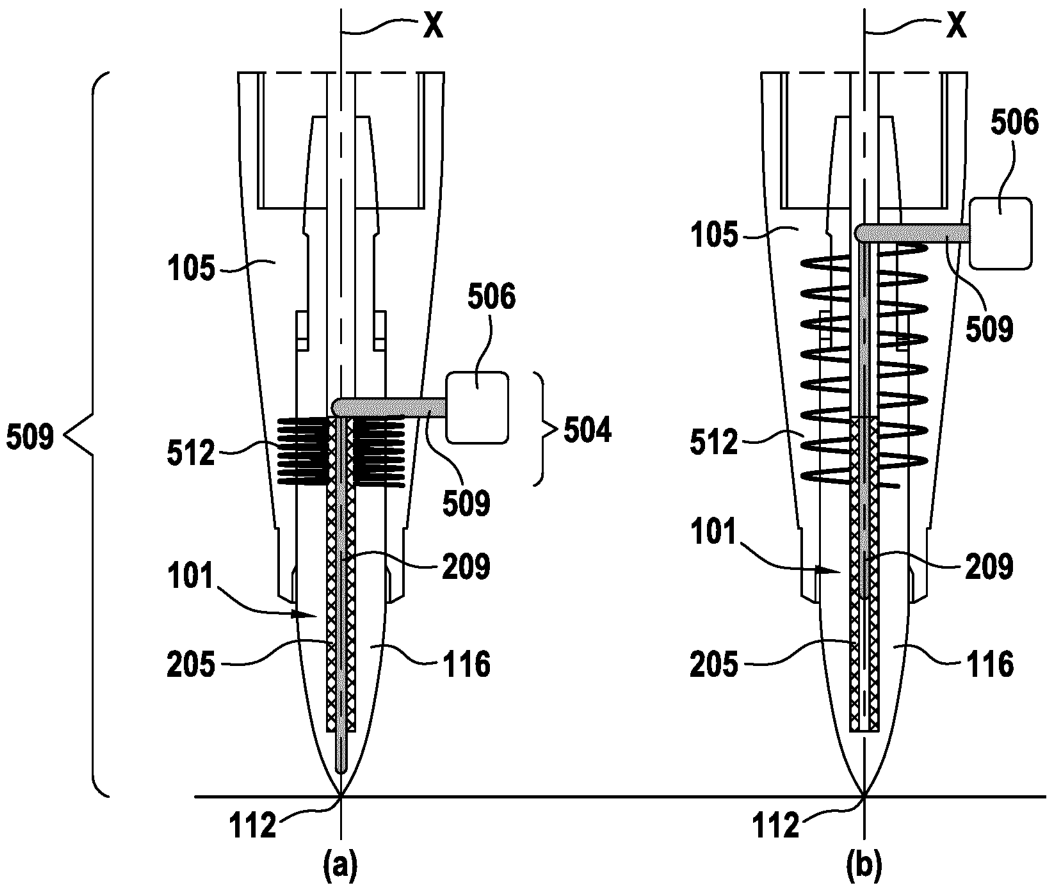
FIG. 5A-B shows another exemplary operation of a core moving mechanism of the present disclosure.

In examples shown by FIG. 5A-B, a core moving mechanism 504 may be located in the forward end 509 of the marking instrument 102. The core moving mechanism 504 may be configured to slide on a side of the marking instrument 102 in coordination with a movement of the tip reinforcing core 209. For instance, the core moving mechanism 504 may include a slider 506 that is connected to the tip reinforcing core 209 via an arm 509. The housing body 105 of the marking instrument 102 may have a slot (not shown) that is coaxial with axis X. When the slider 506 is moved toward the forward position from the rearward position, and vice versa, the arm 509 may pass through the slot. The core moving mechanism 504 may include a spring 512 that is configured to bias the core moving mechanism 504 toward the rearward position. Thus, the core moving mechanism 504 may be configured to lock the position of the tip reinforcing core 209 against movement when the tip reinforcing core 209 is in the forward position and not being adjusted, as shown in FIG. 5A. For instance, the slot may have a notch at the forward position that allows the core moving mechanism 504 to resist the rearward biasing of the spring 512 when the core moving mechanism 504 is pushed into the notch. When the core moving mechanism 504 is removed from the notch, the spring 512 may force the core moving mechanism 504 to the rearward position, as shown in FIG. 5B. In this configuration, the tip reinforcing core 209 may not need to extend through the reservoir 126, and thus may be located entirely within the marking tip 116.

Various combinations of the aforementioned core moving mechanism 412, 504 example configurations are conceived.

For instance, the example of the core moving mechanism 412 wherein the core moving mechanism 412 is the rear end 408 may include a spring, or the core mechanism 504 wherein the core moving mechanism 504 is in the front end 109, 509 may be configured to be screw-like.

Figure 4:
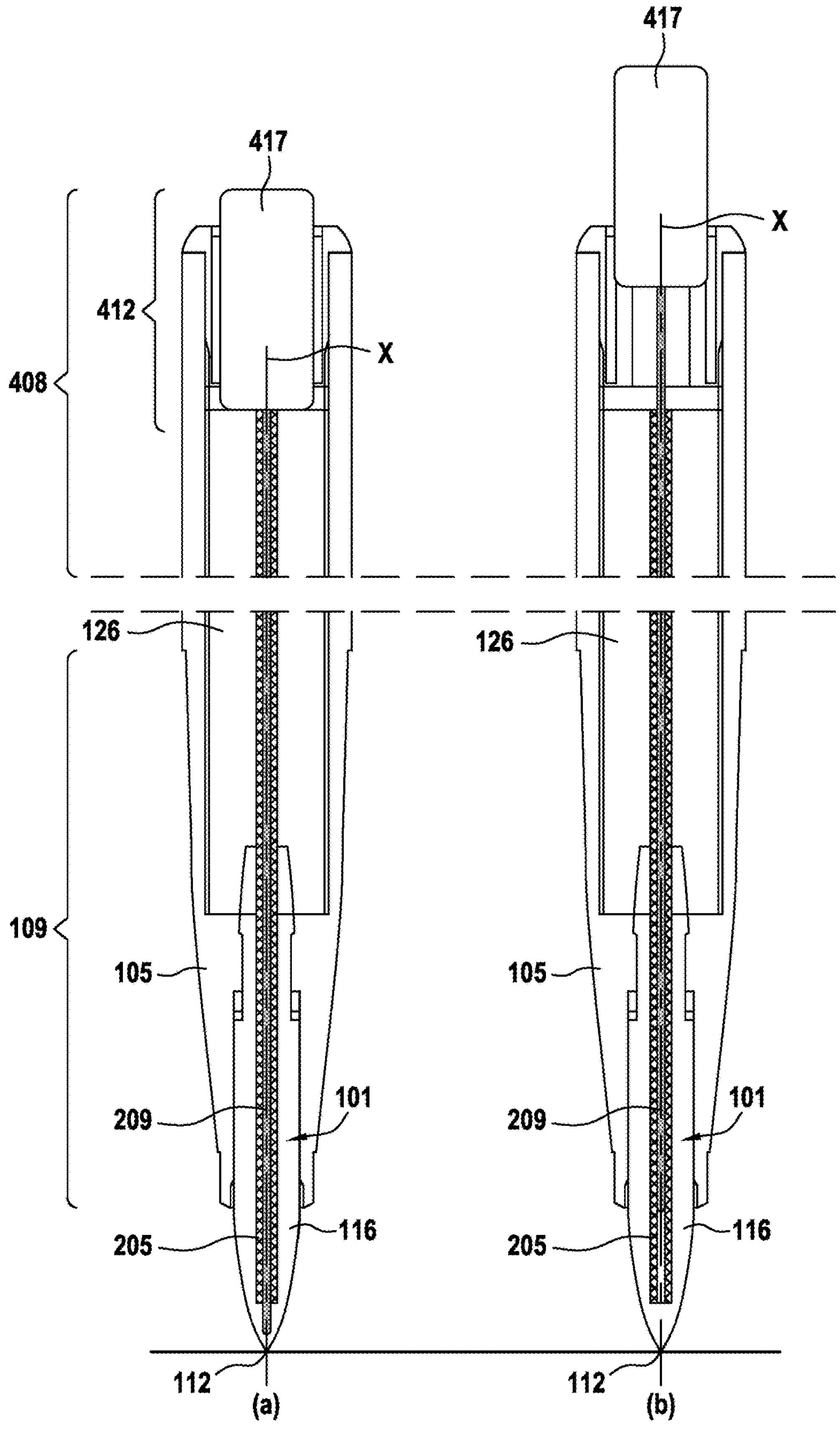
FIGS. 4A-B shows an exemplary operation of a core moving mechanism of the present disclosure.

In an aspect of the disclosure, various components of the marking instrument 102 may be removable and/or replaceable. For instance, the tip reinforcing core 209 may be replaceable. The user may be able to take out the core 209 from the marking instrument 102 and then insert another one. This may enable the core 209 to be replaced, for instance, because the tip reinforcing core 209 is broken or to replace the tip reinforcing core 209 with another that has different characteristics, in particular different rigidities. "The user may use tip reinforcing cores 209 of different rigidities, such as from relatively soft to relatively strong. The user will thus have the ability to adjust the rigidity of the marking tip 116 at different levels when using a softer tip reinforcing core 209 than when using a harder core 209. The replacement of the core 209 could be performed in a typical way, for example as when replacing a lead in a mechanical pencil. In examples, as shown in FIG. 4, the user could remove button 417, in order to gain access to the core 209, and then proceed with removing core 209 from guiding tube 205 and replacing it with another core 209. Alternatively, or additionally, the marking instrument 102 may contain a plurality of tip reinforcing cores 209, wherein each tip reinforcing core 209 may have different characteristics from the other tip reinforcing cores 209. The tip reinforcing cores 209 may be selectable for operation, such as similarly to how a multi-colored pen allows a user to select a specific ink well and tip. Thus, the user may be able to choose which tip reinforcing core 209 to insert and activate within the marking tip 116.

In examples, the features of the marking instrument 102 may be applied to a simple paint brush, which is to say not a brush pen, including a brush used for painting. In this configuration, the marking instrument 102 may not feature an internal pigment reservoir 126 as the marking instrument 102 is configured such that a user can use the marking tip 116 to pick up an external pigment.

In examples, the marking instrument 102 may be adapted to a digital writing instrument for use in drawing software applications in devices with capacitive touchscreens. Thus, the marking instrument 102 may lack features necessary for using physical pigment, such as a pigment reservoir 126.

Although the embodiments of the present disclosure have been disclosed for illustrative purposes, those skilled in the art will appreciate that various modifications and alterations are possible, without departing from the present disclosure. It is also to be understood that such modifications and alterations are incorporated in the scope of the present disclosure and the accompanying claims.

The invention claimed is:

1. A tip reinforcing system that is configured to allow a user to adjust a rigidity attribute of a marking tip of a marking instrument, the tip reinforcing system comprising:
- a tip core cavity that extends axially through the marking tip,
- a tip reinforcing core configured to be movable within the tip core cavity,
- a core guiding tube configured to extend through the tip core cavity, the tip reinforcing core disposed within the core guiding tube, wherein an exterior side surface of the tip reinforcing core comprises threads that interact with a threaded surface on an interior surface of the core guiding tube, and
- a core moving mechanism configured to be operated by a user to move the tip reinforcing core relative to a housing body of the marking instrument in order to adjust a level of exposure of the tip reinforcing core within the marking tip.

2. The tip reinforcing system according to claim 1, wherein the core moving mechanism comprises an actuator that is configured to move between an on position and an off position, wherein the on position moves the tip reinforcing core to a maximally forward position and the off position move the tip reinforcing core to a maximally rearward position.

3. The tip reinforcing system according to claim 1, wherein the core moving mechanism is a screw-type mechanism that is configured to move a position of the tip reinforcing core in an incremental fashion.

4. The tip reinforcing system according to claim 1, wherein the core moving mechanism is configured to have predefined stepped levels of exposure of the tip reinforcing core such that the user can adjust the position of the tip reinforcing core between the levels.

5. The tip reinforcing system according to claim 1, wherein the core moving mechanism is positioned within a rearward end of the marking instrument.

6. The tip reinforcing system according to claim 1, wherein the core moving mechanism is configured to slide on a side of the marking instrument in coordination with a movement of the tip reinforcing core.

7. The tip reinforcing system according to claim 1, wherein the core moving mechanism further comprises a spring and locking mechanism.

8. The tip reinforcing system according to claim 1, further comprising a plurality of tip reinforcing cores, wherein each tip reinforcing core has different rigidity from the other tip reinforcing cores.

9. The tip reinforcing system according to claim 1, further comprising a core guiding tube configured to extend through the marking instrument through the cavity so as to provide a hollow internal path that extends axially through the marking instrument (102) for the tip reinforcing core.

10. The tip reinforcing system according to claim 1, wherein the tip reinforcing core is removable and replaceable.

11. A marking instrument comprising:
- a body housing having a longitudinal axis (X), and
- a marking tip that includes bristle tips or a synthetic porous material,
- a tip reinforcing system according to claim 1.

12. The marking instrument according to claim 11, wherein the marking tip is made from a conductive material such that the marking instrument is adapted for use in drawing software applications in devices with capacitive touchscreens.

13. The marking instrument according to claim 11, wherein the marking instrument is a paint brush that is configured to allow a user to use the marking tip to pick up an external pigment.

14. The marking instrument according to claim 11, further comprising a reservoir configured to contain a pigment, wherein the reservoir is connected to the marking tip.

15. The marking instrument according to claim 11, further comprising a button configured to be removable from body housing of marking instrument.

16. The tip reinforcing system according to claim 1, wherein the tip reinforcing core is substantially a same length as the core guiding tube.

17. The tip reinforcing system according to claim 1, wherein the marking tip includes an internal portion and an external portion, the external portion configured to extend out of the housing body.

18. The tip reinforcing system according to claim 17, wherein when the tip reinforcing core is in a first position within the tip core cavity, the core guiding tube deforms along with the external portion of the marking tip.

19. The tip reinforcing system according to claim 1, wherein an interior surface of the tip core cavity includes threads configured to interact with threads on an outer surface of core guiding tube.

20. The tip reinforcing system according to claim 17, further comprising:

a reservoir, wherein the core guiding tube and the tip reinforcing core extending longitudinally from the reservoir to the external portion of the marking tip.

* * * * *